United States Patent [19]
Lam

[11] Patent Number: 6,077,134
[45] Date of Patent: Jun. 20, 2000

[54] COMBINATION BICYCLE AND BOAT

[76] Inventor: Warren Lam, 3212 Prospect Ave., Rosemead, Calif. 91770

[21] Appl. No.: 09/137,208

[22] Filed: Aug. 20, 1998

Related U.S. Application Data

[60] Provisional application No. 60/082,415, Aug. 29, 1997.
[51] Int. Cl.[7] ................................................. B60F 3/00
[52] U.S. Cl. ............................ 440/12.62; 440/12.66; 440/14; 440/24; 440/26
[58] Field of Search .................... 441/35, 65, 67, 441/79, 74, 129, 130, 131; 440/12, 13, 14, 15, 21, 24, 25, 26, 27, 31, 30, 32, 48, 39, 100, 12.62, 12.66

[56] References Cited

U.S. PATENT DOCUMENTS

| 586,851 | 7/1897 | Knepper | 440/27 |
| 624,366 | 5/1899 | Murphy | 440/48 |
| 1,324,722 | 12/1919 | Bergin | 440/15 |
| 1,324,961 | 12/1919 | Grantham | 440/31 |
| 3,019,760 | 2/1962 | Berliner | 440/32 |
| 3,180,306 | 4/1965 | Gouedy | 440/26 |
| 3,384,047 | 5/1968 | Remley | 440/38 |
| 3,592,468 | 7/1971 | Simendinger | 441/67 |
| 3,695,211 | 10/1972 | Gross | 440/15 |
| 4,926,777 | 5/1990 | Davis, Jr. | 440/12.62 |
| 5,362,264 | 11/1994 | Parant | 440/31 |

*Primary Examiner*—Stephen Avila
*Attorney, Agent, or Firm*—Eric Karich

[57] ABSTRACT

A combination bicycle and boat has a frame; a buoyant rear wheel; and a buoyant front wheel driven by a pair of pedals. The frame is a rigid construction that supports the user on the front and rear wheels for mobility. The frame has a seat and rotatably mounted handle bars, and is preferably shaped to resemble an animal having a head and a tail. The combination preferably further includes a water gun powered by a water pump; and the water gun works in conjunction with a water sensing fan to facilitate a game of water tag. The invention further includes a manually propelled animal boat. The animal boat has a frame having an animal shape having a head and a tail. The animal boat has a crank is located near the head operably engages with a propeller shaped like an animal flipper located near the tail.

7 Claims, 4 Drawing Sheets

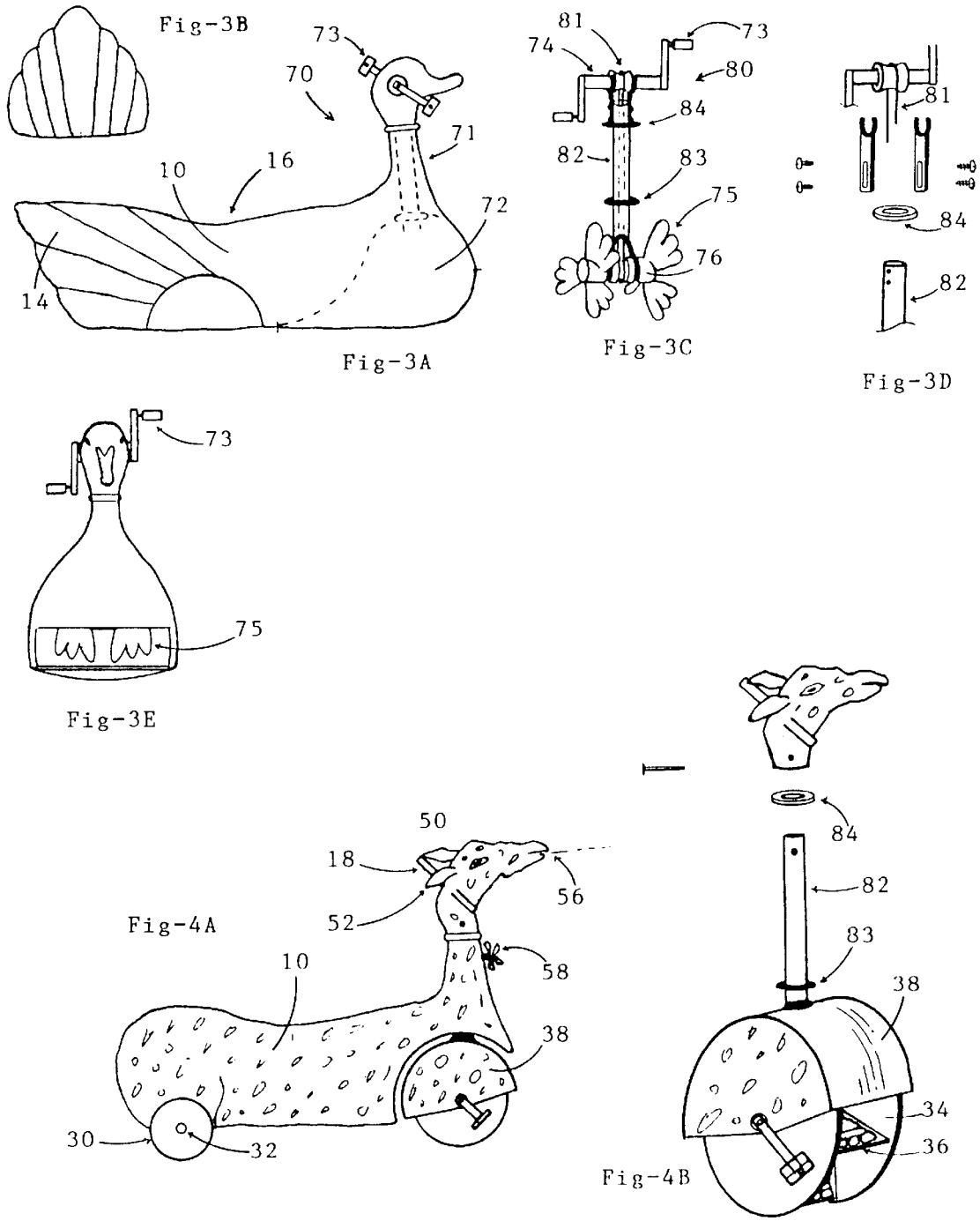

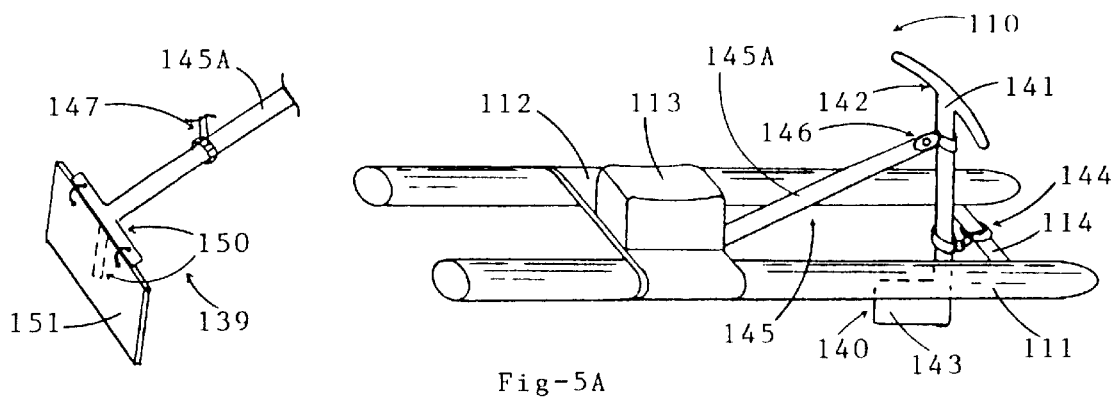
Fig-5B
Fig-5A
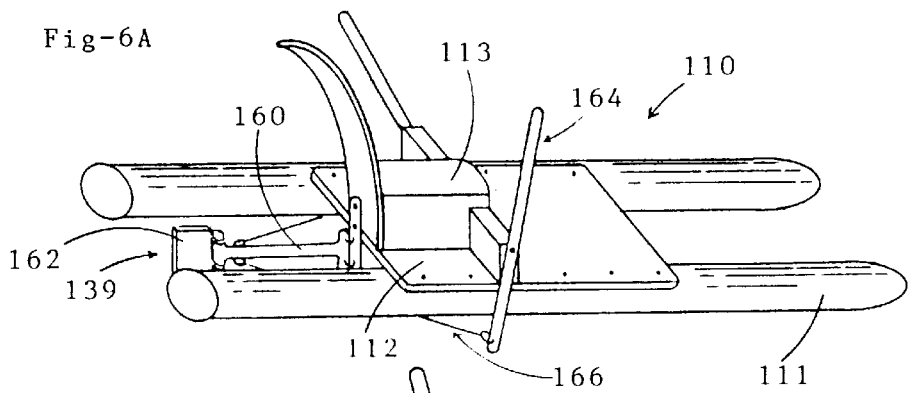
Fig-6A
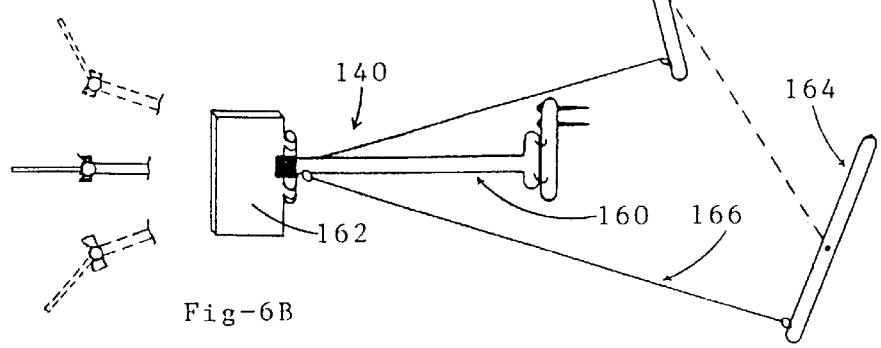
Fig-6B

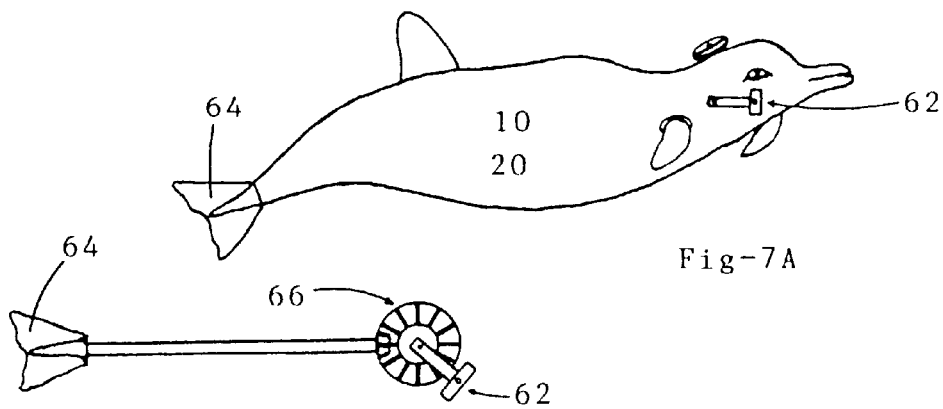
Fig-7A
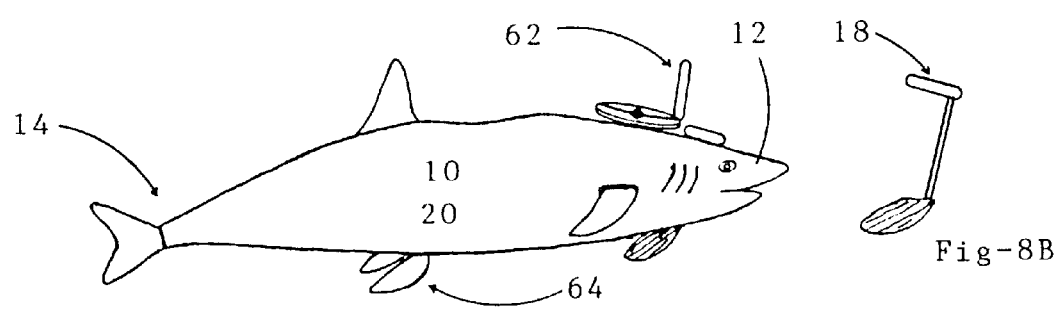
Fig-7B
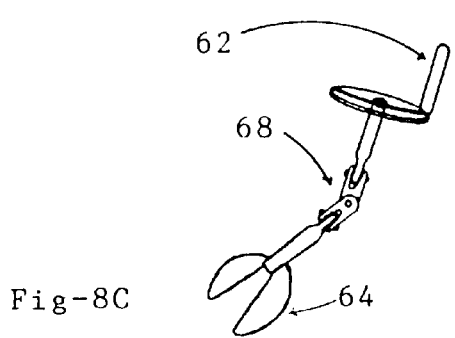
Fig-8A
Fig-8B
Fig-8C

6,077,134

COMBINATION BICYCLE AND BOAT

This application for a utility patent follows a previously filed provisional patent having the Ser. No. 60/082,415 and a filing date of Aug. 29, 1997.

BACKGROUND OF THE INVENTION

1. Field of the Invention

This invention relates generally to bicycles, and more particularly to a bicycle that can also be ridden across a body of water, acting as a manually powered boat.

2. Description of Related Art

Prior art inventions include various bicycles with various special features. The prior art also includes boats that can be pedaled for manual power. The prior art does not teach, however, a bicycle that can be pedaled around on land, and then be ridden directly into the water and ridden as a manually powered boat.

There is a need for such an invention because people are always looking for a fan way to play in the water. This invention includes the benefits of riding a bicycle with the benefits of a water sport. The present invention fulfills these needs and provides further related advantages as described in the following summary.

SUMMARY OF THE INVENTION

The present invention teaches certain benefits in construction and use which give rise to the objectives described below.

The present invention provides a combination bicycle and boat. The combination comprises a frame; a buoyant rear wheel; a buoyant front wheel having a cover; and a drive means. The cover of the buoyant front wheel allows the paddles to propel the boat even when under water. The frame is a rigid construction that supports the user on the front and rear wheels for mobility. The frame has a seat means and a steering means, and is preferably shaped to resemble an animal having a head and a tail. The combination preferably further includes a water projecting means and a water sensing means. In its preferred embodiment, the water projecting means is a water gun having a water pump, a water intake tube, and a water projecting outlet.

The invention further includes a manually propelled duckboat. This duck-boat includes a unique pulley operated drive that allows children easier and greater enjoyment of the water.

The invention also includes a surf bike. The surf bike has a narrow, buoyant surf frame that allows for great speed and mobility necessary to surf waves. The surf bike also has a screw type propeller that moves a greater quantity of water than ordinary propellers, thereby further increasing mobility.

The invention further includes a self propelled double tube boat. The self propelled double tube boat has unprecedented flotation and stability. Two preferred embodiments provide two unique combination drive and steering means.

The invention finally also includes a manually propelled animal boat. The animal boat has a frame having an animal shape having a head and a tail. The animal boat has a crank is located near the head operably engages with a propeller shaped like an animal flipper located near the tail.

A primary objective of the present invention is to provide a combination bicycle and boat having advantages not taught by the prior art.

Another objective is to provide a toy and sporting device for both young and old that allows the user to ride both on land and in water.

A further objective it to provide a combination having a water gun that allows the users to play water tag with dueling bursts of water.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 3A is a side elevational view of a duck boat;

FIG. 3B is a rear elevational view of the duck boat;

FIG. 3C is a perspective view of a driving/steering assembly of the duck boat;

FIG. 3D is a fragmented exploded front elevational view of the driving/steering assembly of the duck boat;

FIG. 3E is a front elevational view of the duck boat;

FIG. 4A is a side elevational view of a giraffe boat embodiment of the bike boat;

FIG. 4B is a exploded perspective view of the buoyant front wheel showing a front wheel cover;

FIG. 5A is a perspective view of a first embodiment of a self propelled double tube boat;

FIG. 5B is a fragmented perspective view of a paddle and paddle brace of the first embodiment of the double tube boat;

FIG. 6A is a perspective view of a second embodiment of the double tube boat;

FIG. 6B is a perspective view of the combination drive and steering means thereof, FIG. 7A is a perspective view of an animal boat having a frame shaped like a dolphin;

FIG. 7B is a side elevational view of a drive means of the animal boat;

FIG. 8A is a perspective view of an animal boat having a frame shaped like a shark;

FIG. 8B is a side elevational view of a steering means thereof; and

FIG. 8C is a side elevational view of a drive means thereof.

DETAILED DESCRIPTION OF THE INVENTION

Figure 1:
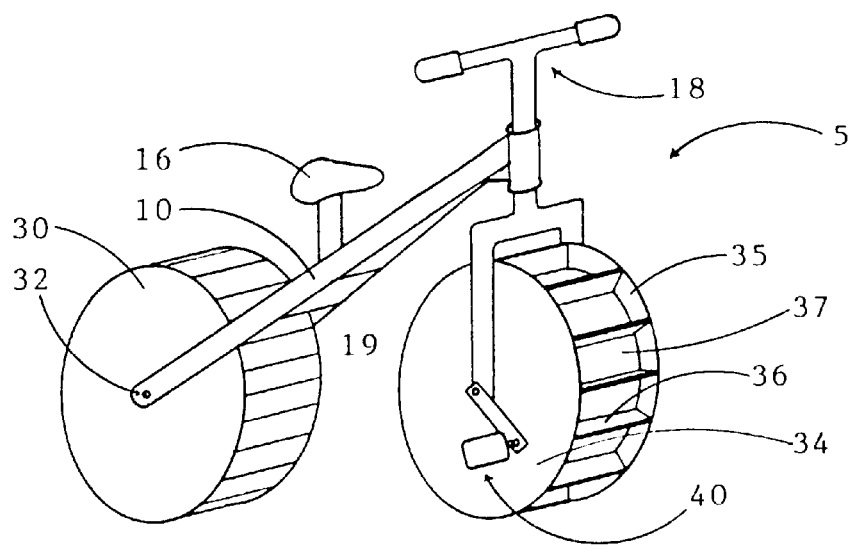
FIG. 1 is a perspective view of a bike boat.

The above described drawing figures illustrate the invention, a combination 5 bicycle and boat. As shown in FIG. 1, the combination 5 comprises a frame 10; a buoyant rear wheel 30; a buoyant front wheel 34; and a drive means 40.

The Bike Boat Embodiment

As shown in FIG. 1, the frame 10 is a rigid construction that supports the user on the front and rear wheels 34 and 30 for mobility. The frame 10 has a seat means 16 and a steering means 18. In a first embodiment, the seat means 16 is an ordinary bicycle seat as shown in FIG. 1. In alternative embodiments, as shown in Figs., the frame 10 is shaped to resemble an animal having a head 12 and a tail 14. The frame 10 is preferably shaped like a giraffe, a duck, or another friendly animal familiar to young children. FIG. 4 shows various other embodiments. In these preferred embodiments, the seat means 16 is integral with the frame 10, the seat means 16 being defined by the shape of the frame 10 between the head 12 and the tail 14. In the second and third embodiments, in which the frame 10 resembles a giraffe and a duck respectively, the frame 10 further includes a durable plastic or rubber cover 20 that is molded in the shape of the animal. This cover 20 is then painted, preferably with bright colors, to resemble the animal being depicted. The frame 10 is preferably made of a rigid and lightweight material such as plastic or aluminum. The steering means 18 is preferably a handle bar 18 such as is commonly used on traditional bicycles, the handle bar 18 being swivel-mounted on the remainder of the frame 10, the handle bar 18 extending to a terminal fork. Examples of the steering means 18 are shown in FIGS. 1, 2B, 3B, and 6.

As shown in FIGS. 1 and 4A, the buoyant rear wheel 30 is preferably a pair of roughly cylindrically shaped wheel rotatably attached to the frame 10, preferably with a bolt 32 through the center of each of the rear wheels 30. The rear wheels 30 are preferably made of molded durable plastic rigid enough to support the weight of the user on the land, and also buoyant enough to help support the combination 5 when it is used in the water. The combination 5 further includes a buoyant front wheel 34 rotatably attached to the steering means 18. Examples of the front wheel 34 are shown in FIGS. 1, 4A, and 4B. The front wheel 34 is similar to the rear wheel 30, except the front wheel 34 further includes a plurality of animal's feet 36 operable as paddles. The front wheel 34 is attached to the steering means 18, preferably to the terminal fork of the handle bar 18. The first wheel 34 includes a pair of disk shaped opposing sidewalls 35 connected by an axle 37. The paddles 36 extend outward from the axle 37 far enough to operate to propel the combination 5, but not further than the circumference of the opposing sidewalls 35. Since the paddles 36 do not extend beyond the opposing sidewalls 35, the first wheel 34 operates on land as well as in the water. The animal's feet 36 dig into the water while the combination 5 is used as a boat, propelling the combination 5 through the water. The front and rear wheels 34 and 30 are preferably filled with a buoyant foam filling for wheel strength and added buoyancy. The frame 10 preferably forms a covered fender 38 over the top of the front wheel 34, facilitating the forward drive power of the front wheel 34.

The drive means 40 operably engages the front wheel 34. The drive means 40 is preferably a pair of foot actuated pedals, as shown in FIGS. 1, 2A, 4A, and 4B. The foot actuated pedals 40 are preferably attached directly to the central axis of the front wheel 34 through the terminal fork 19 forming a front wheel hub. In an alternative embodiment, the drive means 40 is a pair of hand actuated pedals, as shown in FIGS. 3A and 3C. The hand actuated pedals 40 are preferably mechanically connected to the front wheel 34 with a drive chain located down the hollow middle of the steering means 18. By turning the pedals 40, the user causes the front wheel 34 to rotate. On land, the rotating wheel causes the combination 5 to roll across the ground. On the water, the rotating front wheel 34 causes the animal's feet 36 to dig into the water, propelling the combination 5 forward.

The Giraffe Embodiment

As shown in FIGS. 4A and 4B, the combination 5 bicycle and boat preferably further includes a front wheel cover 69 that covers the upper half of the buoyant front wheel 30. The front wheel cover 69 covers all of and closely conforms to the upper half of the front wheel 30 thereby enabling the plurality of paddles 36 to push water in only one direction, thereby serving to propel the combination 5 through the water even when the front wheel 30 is completely submerged. The front wheel cover 69 enables the animal's feet 36 to push water in only one direction, increasing the propulsive power of the buoyant front wheel 30. The frame 10 is preferably shaped to resemble a giraffe, the animal's feet 36 resemble the feet of a giraffe, and the buoyant rear wheel means 30 is a pair of wheels rotatably mounted at the rear of the frame 10.

The combination 5 preferably further includes a water projecting means 50 and a water sensing means 58, the water sensing means 58. In its preferred embodiment, as shown in FIG. 4A, the water projecting means 50 has a water pump 52 and a water projecting outlet 56. The water pump 52 is preferably a flexible, resilient bulb shaped like an animal ear, the bulb being mounted on the steering means 18. The water projecting means 50 preferably further includes a water intake tube that hangs down to below water level so when the combination 5 is floating in the water the water projecting means 50 is supplied with water. The water sensing means 58 is preferably a windmill style sensor that spins when struck by a stream of water from an opponent. The water sensing means 58 is preferably mounted on the frame 10 near the front, although many positions are possible. It is also possible to include many water sensing devices in several places on the frame 10. The water sensing means 58 preferably further includes a hit indicating means that indicates, by audio or visual signal, that the water sensing means 58 has been struck. By producing a noise or flash of light when hit, the hit indicating means facilitates a game of water tag in which various players, each riding one of the combination 5, compete to try and shoot the others with their water projecting means 50, while avoiding being struck themselves.

The Duck Boat Embodiment

The invention further includes a manually propelled duck-boat 70 shown in FIGS. 3A, 3B, 3C, 3D, and 3E. The manually propelled duck-boat 70 includes a frame 10 having an duck-shape, the frame 10 having a neck 71, a front-paddle well 72, and a seat means 16. The manually propelled duck-boat 70 further includes a steering means 16 shaped like a duck's head, the steering means 16 engaging the neck of the frame. A pair of hand cranks 73 located on either side of the head are connected by a drive pulley shaft 74. A duck's feet 75 operable as paddles provide the manually propelled duck-boat 70 with propulsion. The duck's feet 75 are located within the front-paddle well 72 and are connected by a paddle pulley shaft 76. The manually propelled duck-boat 70 further includes a driving/steering assembly 80 comprising a drive belt 81 operably engaged to both the drive pulley shaft 74 and the paddle pulley shaft 76, the drive belt 81 running through the interior of a link tube 82, the link tube 82 being operably engaged to both the drive pulley shaft 74 and the paddle pulley shaft 76. A fixed ring 83 and a locking ring 84 attached to the link tube 82 cooperating to rotatably lock the driving/steering assembly 80 to the frame 10. The driving/steering assembly 80 enable the drive pulley shaft 74 to turn the paddle pulley shaft 76 via the drive belt 81, and also enabling the steering means 18 to rotate the pair of paddles 75, thereby steering the duck-boat 70.

The Surf Bike Embodiment

Figure 2A:
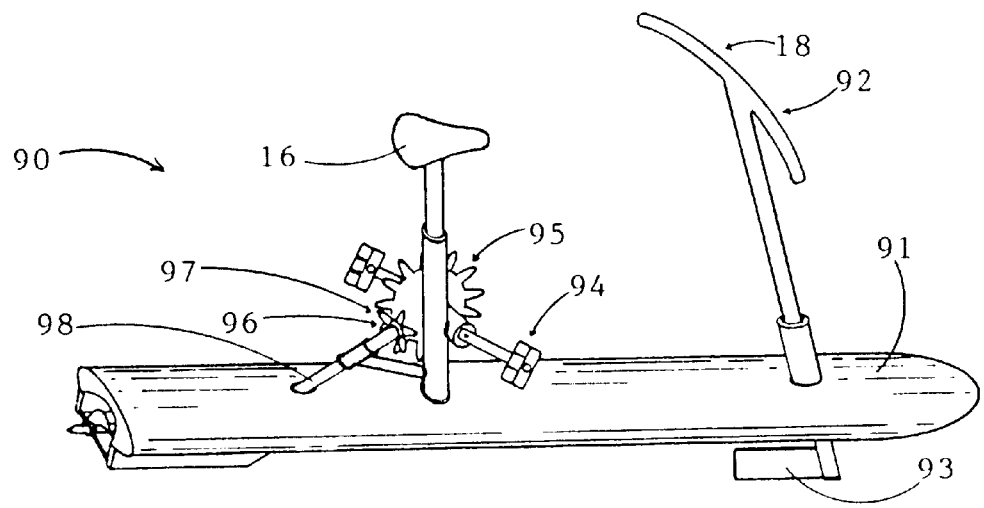
FIG. 2A is a perspective view of a surf boat.
Figure 2B:
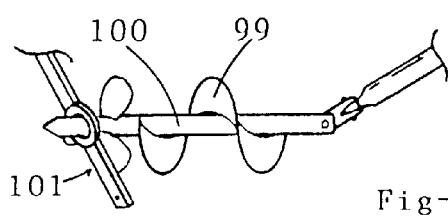
FIG. 2B is a fragmented perspective view of a propeller of the surf boat.

The invention further includes a surf bike 90 shown in FIGS. 2A and 2B. The surf bike 90 has a narrow, buoyant surf frame 91 that allows the surf bike 90 to move very quickly across the water, thereby allowing the user to surf the surf bike 90 on waves that would tend to swamp another boat. The surf bike 90 includes a seat means 16 extending upwardly from the surf frame 91. A steering bar 92 extends upwardly from the surf frame 91, the steering bar 92 rotatably engaging the surf frame 91 and extending through the surf frame 91 to form a rudder means 93. A pair of pedals 94 are operably engaged to a main gear 95, the main gear 95 turning a drive gear 96 attached to a drive shaft 98. The drive gear 96 has cone shaped drive teeth 97 to reduce friction.

A propeller 100 is operably engaged to the drive shaft 98 with a joint 99. The propeller 100 is preferably a screw type propeller as shown in FIG. 2B. The screw type propeller 100 is preferred because it pushes a larger volume of water than a traditional propeller. The propeller 100 is secured in an operable orientation with a rudder bracing support 101 located opposite the joint 99. A pair of propeller protecting fins 102 are positioned on either side of the propeller 100 forming a water flow chamber 103 around the propeller 100. The fins 102 protect the propeller 100 from damage; they protect the user from the propeller 100; and the fins 102 direct the flow of water from the screw type propeller 100, making the screw type propeller 100 more efficient.

The Self Propelled Double Tube Boat Embodiment

The invention further includes a self propelled double tube boat 110 shown in FIGS. 5A, 5B, 6A, and 6B. The self propelled double tube boat 110 has a pair of buoyant tubes 111 that allow the boat 110 to remain afloat despite being capsized by a wave. The pair of buoyant tubes 111 provide the boat 110 with great stability. The pair of buoyant tubes 111 are connected together a first connection means 112. The first connection means 112, preferably a molded plastic or fiberglass board, connects the pair of buoyant tubes 111 together in a parallel and spaced apart relationship; and the first connection means 112 has a seat 113. A second connection means 114, preferably a second molded plastic or fiberglass piece, works in conjunction with the first connection means 112 to connect the pair of buoyant tubes 111 together in a parallel and spaced apart relationship; and the second connection means 114 further has a foot brace made of rubber or other slip-resistant material. A combination drive and steering means 140 provides the boat with power and a means of steering. There are two preferred embodiments for the combination drive and steering means 140.

In the first preferred embodiment, as shown in FIGS. 5A and 5B, the combination drive and steering means 140 includes a steering bar 141 having a steering handle 142 at one end and a rudder 143 attached to its opposite end, the steering bar being attached therebetween with a first attachment means 144 to the second connection means 114. The first attachment means 144 allows the steering bar 141 to rotate; and it allows angular translation of the steering bar 141; but it restricts longitudinal movement of the steering bar 141. The combination drive and steering means 140 further includes a drive paddle means 145 operably engaged to the steering bar 120 above the first attachment means 144 with a second attachment means 146. The drive paddle means 145 preferably has a drive shaft 145A slidably mounted to the first connection means 112 with a third attachment means 147. The third attachment means 147 is preferably a cylinder integrally attached to the first connection means 112. As shown in FIG. 5B, the drive shaft 145A terminates in a paddle brace 150. A paddle 151 is hingably attached to the paddle brace 150 such that the paddle brace 150 maintains the paddle 151 in a vertical position when the paddle is pushed rearwardly, but the paddle hinges to a horizontal position when the paddle is pulled forward.

In a second preferred embodiment of the self propelled double tube boat 110, as shown in FIGS. 6A and 6B, the combination drive and steering means 140 includes a swing arm 160 hingably attached to the first connection means 112. A paddle 162 is hingably attached to the swing arm 160. A pair of pull arms 164, each pull arm 164 being located on opposing sides of the double tube boat 110, are rotatably connected to the double tube boat 110. A pair of cables 166 manipulate the swing arm 160 and the paddle 162. Each cable 166 is connected to its respective pull arm 164 and to opposing sides of the swing arm 160. By pulling one of the pull arms 164, the user is able to pull the attached cable 166, causing the swing arm 160 to swing and causing the paddle 162 to propel the double tube boat 110 through the water. By altering the force of each stroke, the user is thereby able to steer the double tube boat 110.

The Dolphin and Shark Embodiment

The invention further includes a manually propelled animal boat 60, as shown in FIGS. 7A, 7B, 8A, 8B, and 8C. The animal boat 60 has a frame 10 having an animal shape, the animal shape having a head 12 and a tail 14. As shown in FIGS. 7A and 8A, the frame 10 preferably resembles a water animal such as a shark or a dolphin. The frame 10 is preferably a rigid and buoyant material such as plastic. The frame 10 most preferably has a soft outer surface made of rubber. Inside, the frame 10 is preferably filled with foam to facilitate flotation.

A crank 62 is located near the head 12 of the animal shape. A animal flipper 64 operable as a propeller is located near the tail 14. The animal flipper 64 is operably engaged with the crank 62, preferably with a gear 66 and a drive shaft 68. As shown in FIGS. 8B and 8C, the specific configuration of the gear 66 and drive shaft 68 will vary depending on the animal shape and the location of the crank 62 with respect to the animal flipper 64. A steering means 18, preferably located near the crank 62, provides the user with a convenient method of steering the animal boat 60, although the user also can steer the animal boat 60 with his feet hanging in the water.

Both the bike/boat combination 5 and the animal boat 60 provide people with a fun way to play in the water. Manually propelled vessels are great fun for young and old alike. Furthermore, providing a water gun 50 that are integral with the combination 5 makes the game even more fan. Finally, both embodiments provide great exercise and can also be used in racing events.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination bicycle and boats the combination comprising:

a frame having a seat and a means for steering;

a buoyant rear wheel rotatable attached to the frame;

a buoyant front wheel rotatable attached to the steering means, the front wheel having a pair of disk shaped opposing sidewalls connected by an axle, a plurality of saddles radially extending from the axle no further than the opposing sidewalls;

a means for manually rotating the front wheel to propel the combination across either land or water; and a front wheel cover that covers all of and closely conforms to the upper half of the buoyant front wheel thereby enabling the plurality of paddles to push water in only one direction, thereby serving to propel the combination through the water even when the front wheel is completely submerged.

2. A manually propelled duck-boat comprising:

a frame having an duck-shape, the frame having a neck, a front-paddle well, and a seat;

a steering means shaped like a duck's head, the steering means engaging the neck of the frame;

a pair of hand cranks, the hand cranks being located on either side of the head and connected by a drive pulley shaft;

a pair of duck's feet operable as paddles, the duck's feet being located within the front-paddle well and connected by a paddle pulley shaft;

a driving/steering assembly comprising a drive belt operably engaged to both the drive pulley shaft and the paddle pulley shaft, the drive belt running through the interior of a link tube, the link tube being operably engaged to both the drive pulley shaft and the paddle pulley shaft; and a fixed ring and a locking ring attached to the link tube cooperating to rotatably lock the driving/steering assembly to the frame, the driving/steering assembly enabling the drive pulley shaft to turn the paddle pulley shaft via the drive belt, and also enabling the steering handle to rotate the pair of duck's feet, thereby steering the duck-boat.

3. A self propelled double tube boat comprising:

a pair of buoyant tubes;

a first connection means connecting the pair of buoyant tubes together in a parallel and spaced apart relationship, the first connection means having a seat;

a second connection means working in conjunction with the first connection means to connect the pair of buoyant tubes together in a parallel and spaced apart relationship, the second connection means having a foot brace;

a steering bar having a steering handle at one end and a rudder attached to its opposite end, the steering bar being attached therebetween with a first attachment means to the second connection means, the first attachment means allowing the steering bar to rotate and allowing angular translation of the steering bar, but restricting longitudinal movement of the steering bar;

a drive paddle means operably engaged to the steering bar above the first attachment means with a second attachment means, the drive paddle means having a drive shaft slidably mounted to the first connection means with a third attachment means, the drive shaft terminating in a paddle brace; and a paddle hingably attached to the paddle brace such that the paddle brace maintains the paddle in a vertical position when the paddle is pushed rearwardly, but the paddle hinges to a horizontal position when the paddle is pulled forward.

4. A self propelled double tube boat comprising:

a pair of buoyant tubes;

a first connection means connecting the pair of buoyant tubes together in a parallel and spaced apart relationship, the first connection means having a seat;

a second connection means working in conjunction with the first connection means to connect the pair of buoyant tubes together in a parallel and spaced apart relationship, the second connection means having a foot brace;

a swing arm hingably attached to the first connection means;

a paddle hingably attached to the swing arm;

a pair of pull arms, each located on opposing sides of the double tube boat, the pull arms being rotatably connected to the double tube boat; and a pair of cables, each cable connecting its respective pull arm to opposing sides of the swing arm, whereby pulling one of the pull arms pulls the cable, causing the swing arm to swing and causing the paddle to propel the double tube boat through the water.

5. A manually propelled animal boat comprising:

a buoyant frame having an animal shape, the animal shape having a head and a tail, the exterior of the buoyant frame being shaped to allow a user to ride astride the buoyant frame;

a crank located near the head of the animal shape;

an animal flipper operable as a propeller, the animal flipper being located near the tail, the animal flipper being operably engaged with the crank; and a steering handle rotatably attached to the frame near the crank, the steering handle terminating in a rudder.

6. The animal boat of claim 5 wherein the animal shape resembles a dolphin.

7. The animal boat of claim 5 wherein the animal shape resembles a shark.

* * * * *